April 17, 1962    F. R. MIDDAUGH    3,029,502
TOOL FOR REMOVING HUB CAPS
Filed Feb. 21, 1955

INVENTOR.
Franklin R. Middaugh
BY
Treckwell
Atty.

3,029,502
TOOL FOR REMOVING HUB CAPS
Franklin R. Middaugh, N. 5018 Cannon,
Spokane, Wash.
Filed Feb. 21, 1955, Ser. No. 489,628
1 Claim. (Cl. 29—245)

The present invention relates to improvements in a tool for removing hub caps from the wheels of automotive vehicles.

Most automotive vehicles of the present day have metal caps covering the hub and wheel mounting lugs of the several wheels. These hub caps are secured in place by spring clips and may be removed by inserting a thin piece of metal, such as a screw driver tip, between the cap and the wheel rim and prying outwardly. When it is desired to replace the cap, it is placed against the spring clips and forced over them by a blow on its exterior surface. The difficulty encountered in using common tools such as screw drivers to remove and replace the caps is that they are too short to provide efficient leverage, and provide for no means to pound the cap back into place without denting or otherwise damaging it.

It is the purpose of the present invention to provide a tool which may be easily used to remove and replace hub caps without necessitating the use of excessive force or damaging the hub cap.

The nature and advantages of my invention will appear more fully from the following description and the accompanying drawings wherein a preferred form of the invention is shown. It should be understood, however, that the decsription and drawings are illustrative only and are not intended to limit the invention except insofar as it is limited by the claim.

Figure 3:
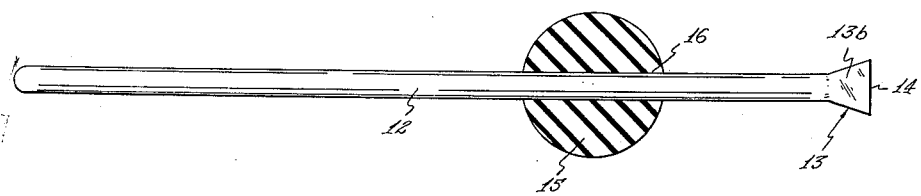
FIGURE 3 is a view taken substantially on the line 3—3 of FIGURE 2.
Figure 2:
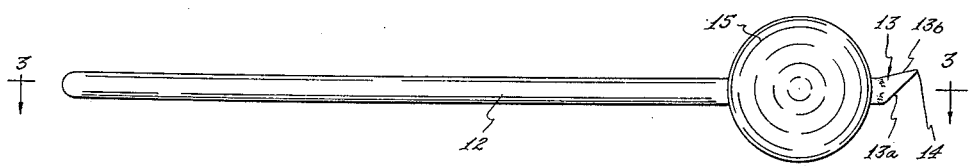
FIGURE 2 is a side view of the tool.
Figure 1:
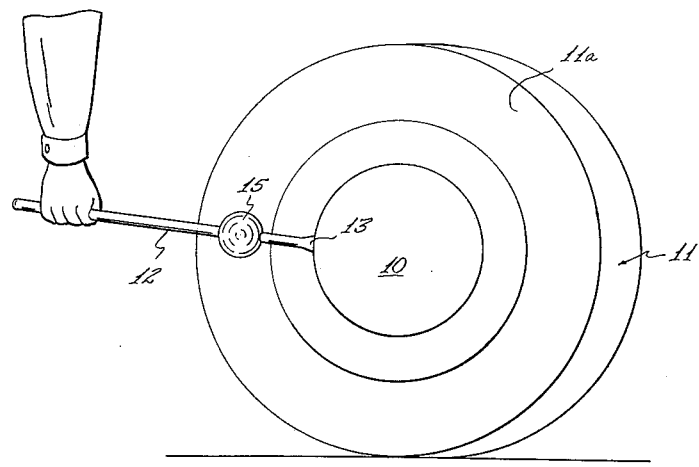
FIGURE 1 is a perspective view illustrating my invention being employed to remove a hub cap from a wheel.

Referring now to the drawings, my hub cap removing tool is shown as being used in relation to the hub cap 10 of an automobile wheel 11. The tool is comprised of a cylindrical bar 12 which has a tapered wedge shaped head 13 at one end thereof. The head 13 is so formed that its lower face 13a is inclined at about forty or forty-five degrees to the axis of the bar 12. The opposite face 13b of the head 13 is inclined at a lesser angle to the bar 12 so that the two faces 13a and 13b converge and form a sharp edge at 14. The tip 14 of the head 13 is considerably wider than the bar 12.

A resilient fulcrum member 15 is slidably mounted on the bar 13. The member 15 is spherical in shape and has an aperture 16 extending through its center, through which the bar 12 extends. The aperture 16 is slightly smaller in cross sectional area than the bar 12, so that the member 15 is expanded slightly and grips the bar 12 when in place. With such a construction, the resilient fulcrum member 15 may be slid along the bar 12 to the desired position, and yet will maintain its position on the bar 12 as the tool is used, due to the friction between the member 15 and the metal. The wide tip 14 of the head 13 provides a stop to pervent the member 15 from sliding off the bar 12.

The use of the tool is extremely simple. The bar 12 is grasped in the hand of the operator, and the wedge shaped head 13 is placed under the edge of the hub cap 10. The head 13 is so placed that the face 13a rests against the wheel 11 and the leading edge 14 is positioned in the interstice between the cap 10 and the wheel 11. The fulcrum member 15 is then slid along the bar 12 until it is adjacent the side wall of the tire 11a on the wheel 11. When the fulcrum member is in place, the bar 12 is moved toward the wheel 11, pressing the fulcrum member 15 against the tire 11a and causing the portion of the bar 12 on the opposite side of the fulcrum member 15 to move outwardly and pry the hub cap 10 loose. In this manner the hub cap 10 is removed with a minimum of effort and time, and without damage either to the cap 10 or the wheel 11.

When it is desired to replace the hub cap 10, the fulcrum member 15 is slid down the bar 12 until it seats adjacent the head 13. In this position, it may be used as a hammer to deliver the blow against the hub cap necessary to replace it. Since the fulcrum member 15 is constructed of soft resilient rubber or an equivalent substance, it will not dent or scratch the hub cap. I have found that material of from 40 to 80 Durometer hardness is most suitable for the fulcrum member 15. Material softer than 40 Durometer deforms too easily to act as a good fulcrum, and material above 80 Durometer is so hard that it will dent the hub cap when used to pound it on.

It is believed that the nature and advantages of my invention appear clearly from the foregoing description.

Having thus described my invention, I claim:

A tool for removing and replacing hub caps comprising a handle bar, a wedge shaped head at one end of said bar, the faces of said head being inclined at an angle from the axis of the bar, and a spherical resilient fulcrum member slidably mounted on said bar and yieldingly gripping the bar to maintain its adjusted position, said fulcrum member being composed of resilient material of from forty to eighty Durometer hardness, and the wedge shaped head being widened in a transverse direction to provide a stop to prevent endwise removal of the fulcrum member over it.

References Cited in the file of this patent
UNITED STATES PATENTS

| | | |
|---|---|---|
| 52,696 | Eddy | Feb. 20, 1886 |
| 394,547 | Thacker | Dec. 11, 1888 |
| 584,189 | Nelson | June 8, 1897 |
| 846,203 | Hawley | Mar. 5, 1907 |
| 1,501,827 | Whisler | July 15, 1924 |
| 2,148,213 | Lyon | Feb. 21, 1939 |
| 2,276,105 | Shiells | Mar. 10, 1942 |
| 2,500,221 | Wagner | Mar. 14, 1950 |